United States Patent [19]
Nishiyama et al.

[11] Patent Number: 5,710,576
[45] Date of Patent: Jan. 20, 1998

[54] PORTABLE ELECTRONIC APPARATUS HAVING PARTIAL DISPLAY FUNCTION

[75] Inventors: Toshiro Nishiyama, Shizuoka; Yasuhiro Kobayashi, Tokyo, both of Japan

[73] Assignee: NEC Corporation, Tokyo, Japan

[21] Appl. No.: 423,857

[22] Filed: Apr. 18, 1995

[30] Foreign Application Priority Data

Apr. 18, 1994 [JP] Japan ................... 6-077724

[51] Int. Cl.⁶ ................ G09G 5/00; H04B 1/08; H04M 1/00
[52] U.S. Cl. ................ 345/169; 345/901; 345/905; 455/348; 379/428
[58] Field of Search ................ 345/168, 169, 345/901, 903, 905; 340/500, 531, 539, 311.1; 455/347, 348, 899; 379/419, 422, 428, 434, 440, 435, 433

[56] References Cited

FOREIGN PATENT DOCUMENTS

| | | | |
|---|---|---|---|
| 0 414 365 | 2/1991 | European Pat. Off. | H04M 1/02 |
| 0 427 361 | 2/1992 | European Pat. Off. | H04M 1/72 |
| 60-230723 | 11/1985 | Japan | H04B 1/38 |
| 2-112041 | 9/1990 | Japan | H04B 7/26 |
| 4-111655 | 4/1992 | Japan | H04M 1/02 |
| 4-273639 | 9/1992 | Japan | H04M 1/02 |
| 5-030166 | 2/1993 | Japan | H04M 1/02 |
| 2 266 429 | 10/1993 | United Kingdom | H04M 1/02 |
| WO 94/13088 | 6/1994 | WIPO | H04M 1/00 |

*Primary Examiner*—Michael H. Lee
*Assistant Examiner*—John W. Miller
*Attorney, Agent, or Firm*—Young & Thompson

[57] ABSTRACT

A portable electronic device has a construction in which a first housing and a second housing are capable of being opened and closed and a display is mounted on an inner side of the first housing. A partial display area of the display is in a visible state even if the second housing is closed, and the full display area becomes in a visible state when the second housing is opened. An open/close state of the housings is detected by an open/close detector mounted on the first housing or the second housing. It may be detected by a user operating a predetermined key. According to the detected open/close state, a displaying area of the information is changed between the partial display area and the full display area. At the open state, the information is displayed in the full display area. At the closed state, the information is displayed in the partial display area.

46 Claims, 5 Drawing Sheets

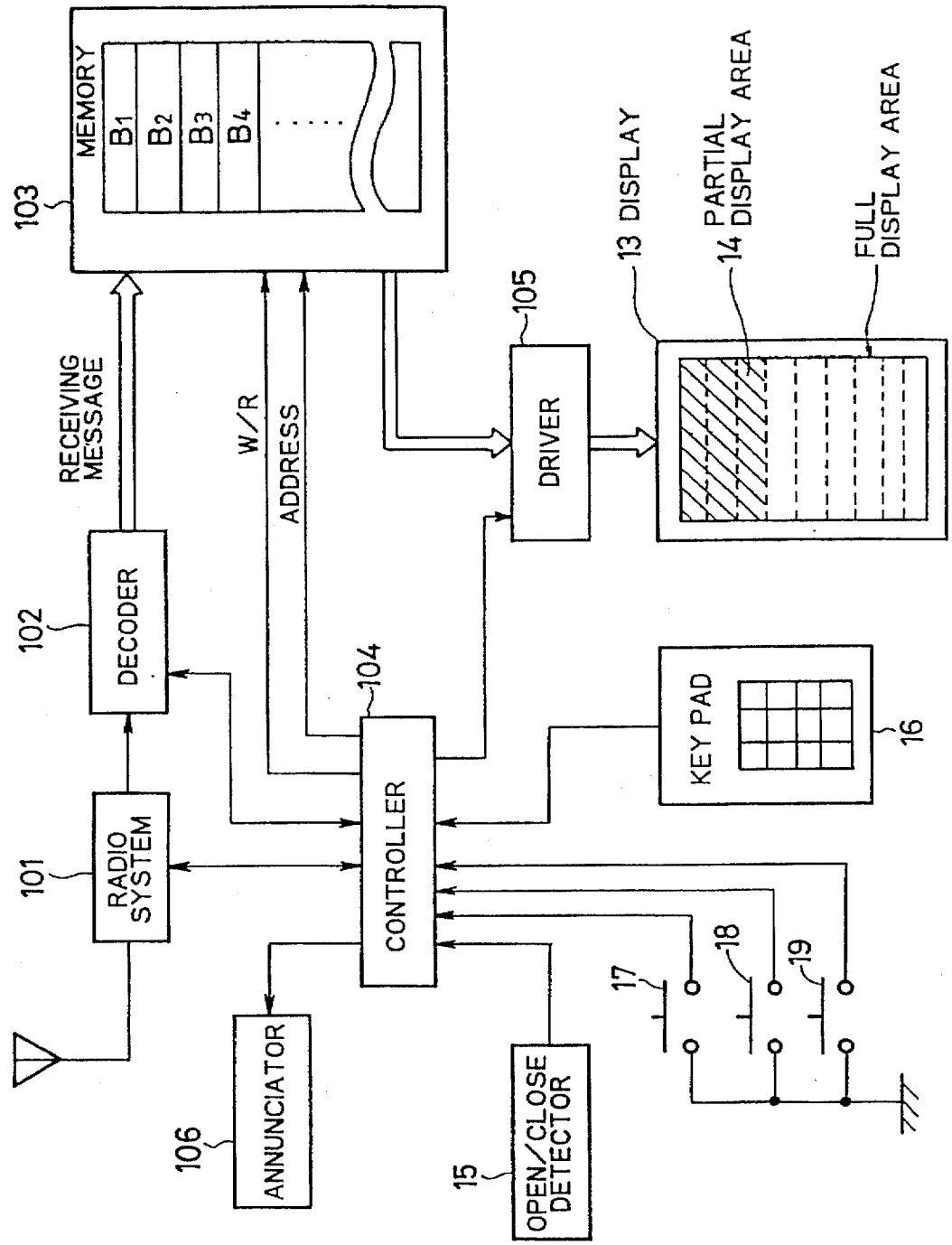

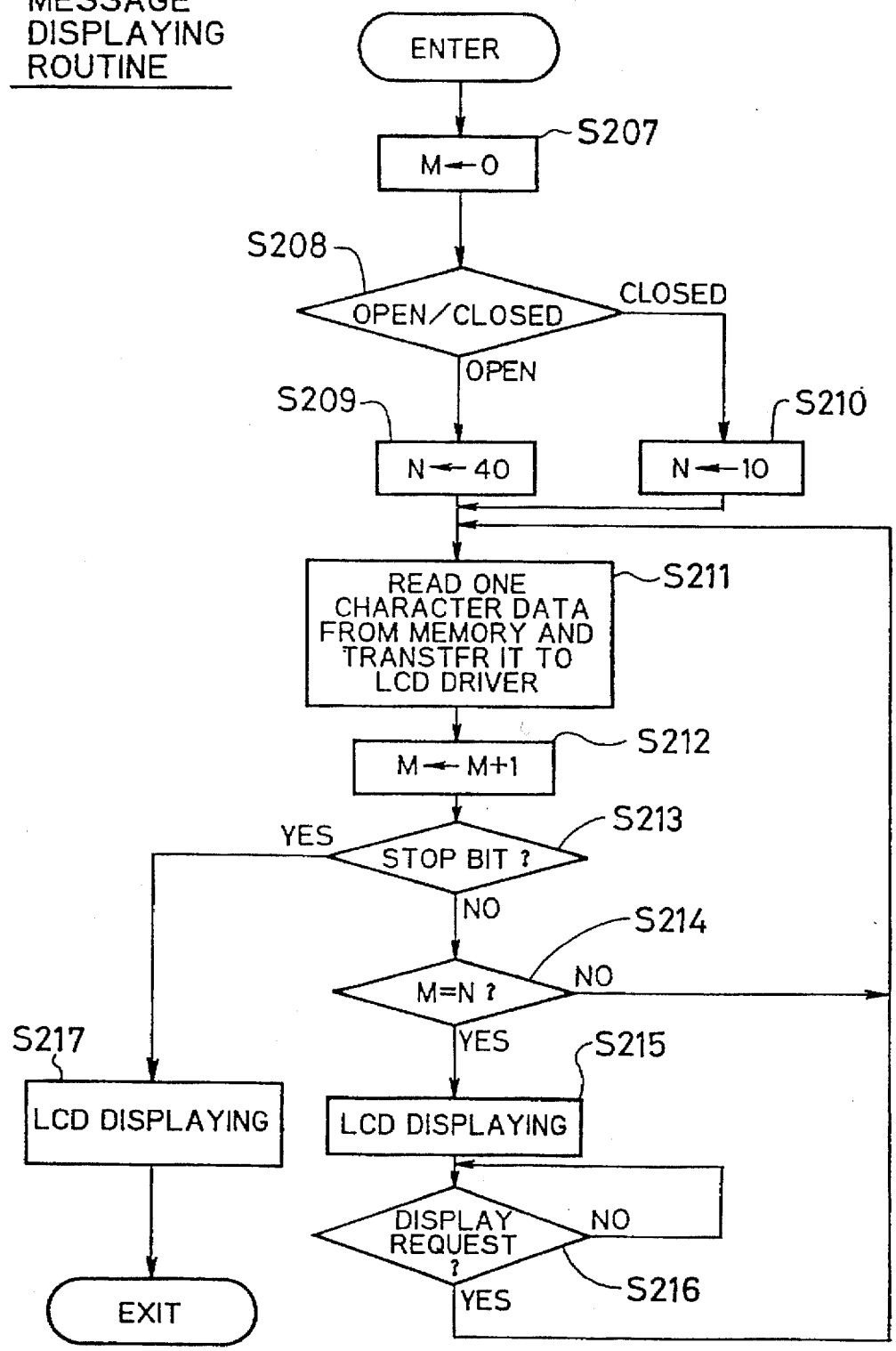

IN OPEN STATE

IN CLOSED STATE

PORTABLE ELECTRONIC APPARATUS HAVING PARTIAL DISPLAY FUNCTION

BACKGROUND OF THE INVENTION

1. Field of the Invention

The present invention relates to a portable electronic apparatus having an opening and closing construction. In particular, the present invention relates to an information display method and device in the portable electronic apparatus.

2. Description of the Relevant Art

In a portable radio apparatus such as a portable radio telephone, a pager and a digital cordless telephone, a message displaying function is indispensable, and a liquid crystal display (LCD) is mounted on almost all the radio apparatuses. Some typical constructions of conventional radio apparatuses will be exemplified hereinafter.

A construction of a selective calling receiver referred to as a pager is disclosed in the official gazette of Japanese Utility Model Application Laid Open No. 2-112041. This selective calling receiver is provided with a LCD which can display characters of one line on the upper face of a main housing body.

A folding-type radio telephone having a display is disclosed in the official gazette of Japanese Patent Application Laid Open No. 60-230723 and the official gazette of Japanese Patent Application Laid Open No. 4-111655, respectively. Any of the radio telephones has a folding construction in which a first housing and a second housing are opened at the time of use, and they are closed at the time of carrying. A key pad and a LCD are mounted on the inner surface of the first housing, and they are covered with the second housing when the first housing and the second housing are closed.

However, in the selective calling receiver as mentioned above, since the LCD is disposed on the upper surface of the main housing body, the display area cannot be enlarged, resulting in a very small amount of information which can be displayed on the LCD.

In this regard, the folding-type radio telephone has the display in the inner surface of the first housing to ensure a larger display area which can display characters of a plurality of lines at a time.

However, in any of the folding radio telephones mentioned above, since all of the displaying portion is covered with the second housing in the closed state, the user must open the second housing to see the message every time an incoming call is received. This causes the convenience of the portable radio apparatus to be reduced.

SUMMARY OF THE INVENTION

It is, therefore, an object of the present invention to provide an information displaying device and method which improves the convenience of operation of a portable electronic apparatus having an open/close construction.

It is another object of the present invention to provide an open/close type portable information displaying apparatus in which the information can be seen in a closed state thereof.

It is still another object of the present invention to provide a method of displaying data which can be seen by a user in a closed state of the open/close type portable apparatus.

The portable electronic device according to the present invention has a construction in which a first housing and a second housing are capable of being opened and closed, and a display is mounted on an inner surface of the first housing. A predetermined partial display area of the display is in a visible state even if the second housing is closed, and the full display area becomes visible when the second housing is opened. An open/close state of the first housing and the second housing is detected by an open/close detector mounted on the first housing or the second housing. It may be detected by a user operating a predetermined key. According to the detected open/close state, a displaying area of the information is changed between the predetermined partial display area and the full display area.

The information displaying apparatus according to the present invention is comprised of a memory for storing data, a controller for changing the amount of data transferred from the memory to a display according to the open/close state of the first housing and the second housing. More specifically, in a case where the housings are in the closed state, the data is transferred from the memory to the display in such a manner that the transferred data is displayed on the predetermined partial display area. On the other hand, in a case where the housings are in the open state, the data is transferred from the memory to the display in such a manner that the transferred data is displayed on the full display area. The remaining data of the data stored in the memory can be seen by scrolling in the partial display or the full display. Accordingly, all of the data can be seen through the predetermined partial display even in the closed state of the housings. It is preferable that a controller for performing data scrolling is disposed on an outer surface of the second housing to scroll the data even in the closed state of the housings.

Moreover, it is not necessary to provide the open/close detector independently. The open/close state of the housings may be judged by a user operating a predetermined key of the portable electronic device. For example, the display may be changed from the partial screen to the full screen in a case where the user opens the second housing of the portable electronic device and then operates any key when the data is displayed on the predetermined partial display area of the display.

Also, other opening and closing mechanisms such as a folding type and a sliding type may be applied to the first housing and the second housing in the present invention.

BRIEF DESCRIPTION OF THE DRAWINGS

FIG. 2 is a block diagram showing the present embodiment;

FIG. 4 is a flowchart showing one embodiment of a method of displaying the received data in the present embodiment;

DETAILED DESCRIPTION OF THE PREFERRED EMBODIMENTS

Figure 1A:
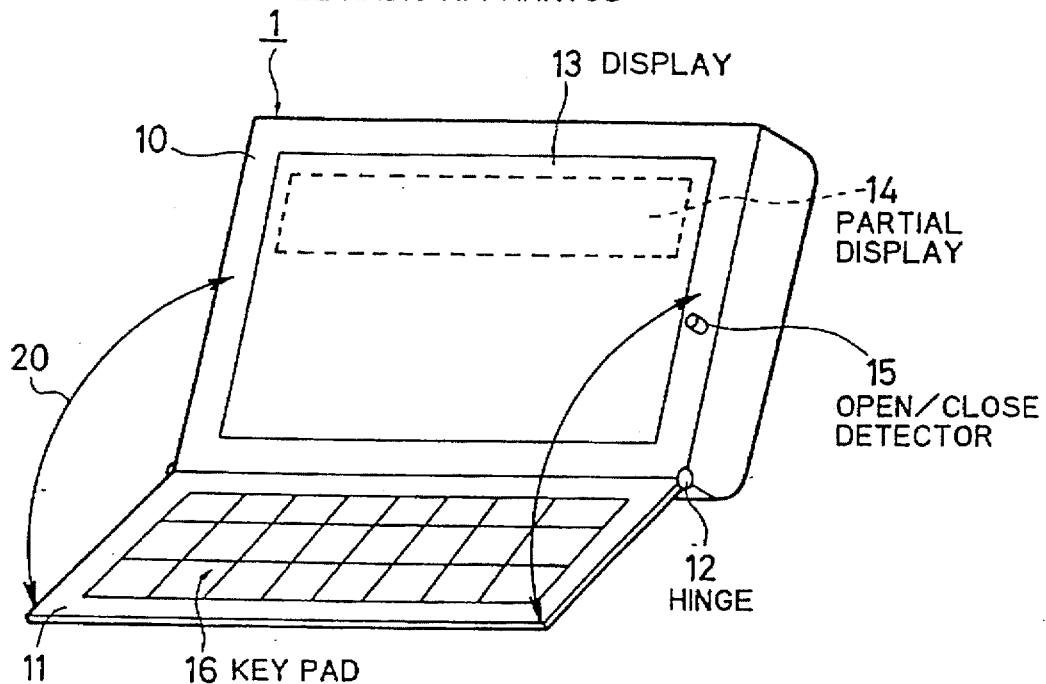
FIG. 1A is a perspective view showing a radio apparatus in an open state, which is one embodiment of the radio electronic apparatus according to the present invention.

As shown in FIG. 1A, in a portable radio apparatus 1 according to the present invention, a first housing 10 and a second housing 11 are connected through a hinge portion 12 rotatably in an arrow direction 20. The first housing 10 is provided with a display 13 at an inner face thereof and a necessary integrated circuit therein. The display 13 has, as described later, a partial display area 14 which has a predetermined lineage and is visible even if the second housing is closed.

The inner face of the first housing 10 is also provided with an open/close detector 15 for detecting an open/close state of the first housing 10 and the second housing 11. An inner face of the second housing 11 is provided with a key pad 16 at which a user dials or inputs various kinds of instructions.

Figure 1B:
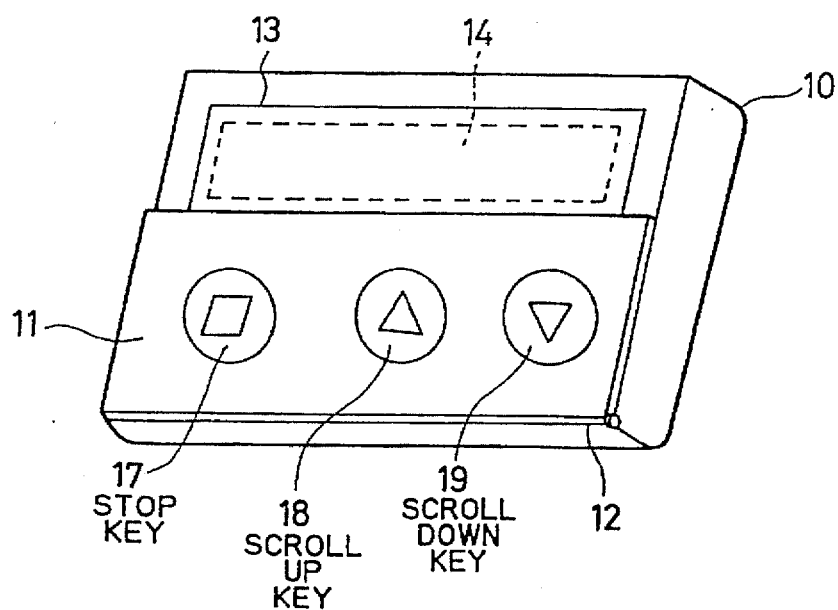
FIG. 1B is a perspective view showing the radio apparatus of FIG. 1 in a closed state.

As shown in FIG. 1B, an outer face of the second housing 11 is provided with an annunciator stop key 17 for stopping an operation of announcing an incoming call, and a scroll-up key 18 and a scroll-down key 19 for scrolling the data displayed on the screen of the display 13. Accordingly, in a state where the second housing 11 is closed, the data displayed on the partial display area 14 of the display 13 can be scrolled by pushing the scroll-up key 18 or the scrolling-down key 19.

A circuit built in the first housing 10 will be described hereinafter with reference to FIG. 2. A radio system 101 receives a radio wave of a predetermined frequency, and outputs a call signal to a decoder 102. The decoder 102 decodes the call signal, and transfers message data thereof to a memory 103 if the destination number of the call signal is identical to the identification number of the radio apparatus 1. The memory 103 comprises a RAM (random access memory), and performs read/write operation of the message data according to an instruction received from a controller 104.

If the destination address number of the call signal decoded by the decoder 102 coincides with the address number of the portable radio apparatus 1, the controller 104 controls the memory 103 such that the message data of the call signal is stored into the memory 103. Also, according to the open/close state detected by the open/close detector 15, the controller 104 reads out the message data from the memory 103 in words.

The message data read out from the memory 103 is transferred to the display 13 through the display driver 105 where the message is displayed on the screen. The display 13, as described above, has the partial display area 14 which can be always seen by the user even if the second housing 11 is in the closed state. The display 13 is comprised of, for example, a liquid crystal display (LCD).

The open/close detector 15 mounted on the inner face of the first housing 10 is comprised of a switch which turns on or turns off according to an opening or a closing of the second housing 11. The controller 104 receives the open/close state of the second housing 11 from the open/close detector 15.

It should be noted that various constructions may be employed in the open/close detector 15. For example, it may include respective electrodes disposed on the first housing 10 and the second housing 11 which come in contact with each other in the closed state of the housings.

The key pad 16 mounted on the inner face of the second housing 11 includes a ten-key pad for dialing and other keys for performing other various functions including an annunciator stop key and a scroll key. The controller 104 performs a certain operation depending on which key is operated. In this embodiment, there are provided three basic function keys on the outer face of the second housing 12: the annunciating stop key 17, the scroll-up key 18 and the scroll-down key 19.

An annunciator 106 also operates under control of the controller 104. When the controller 104 decides that the destination address number of the call signal coincides with the address number of the portable radio apparatus 1, the annunciator 106 announces an incoming call to the user by means of sound, light, or vibration.

Message Displaying

A procedure of displaying the received data in the embodiment will be described in detail with reference to FIGS. 3 and 4. For simplicity, it is assumed that the full display area of the display 13 can display 40 characters and the partial display area 14 can display 10 characters.

Figure 3:
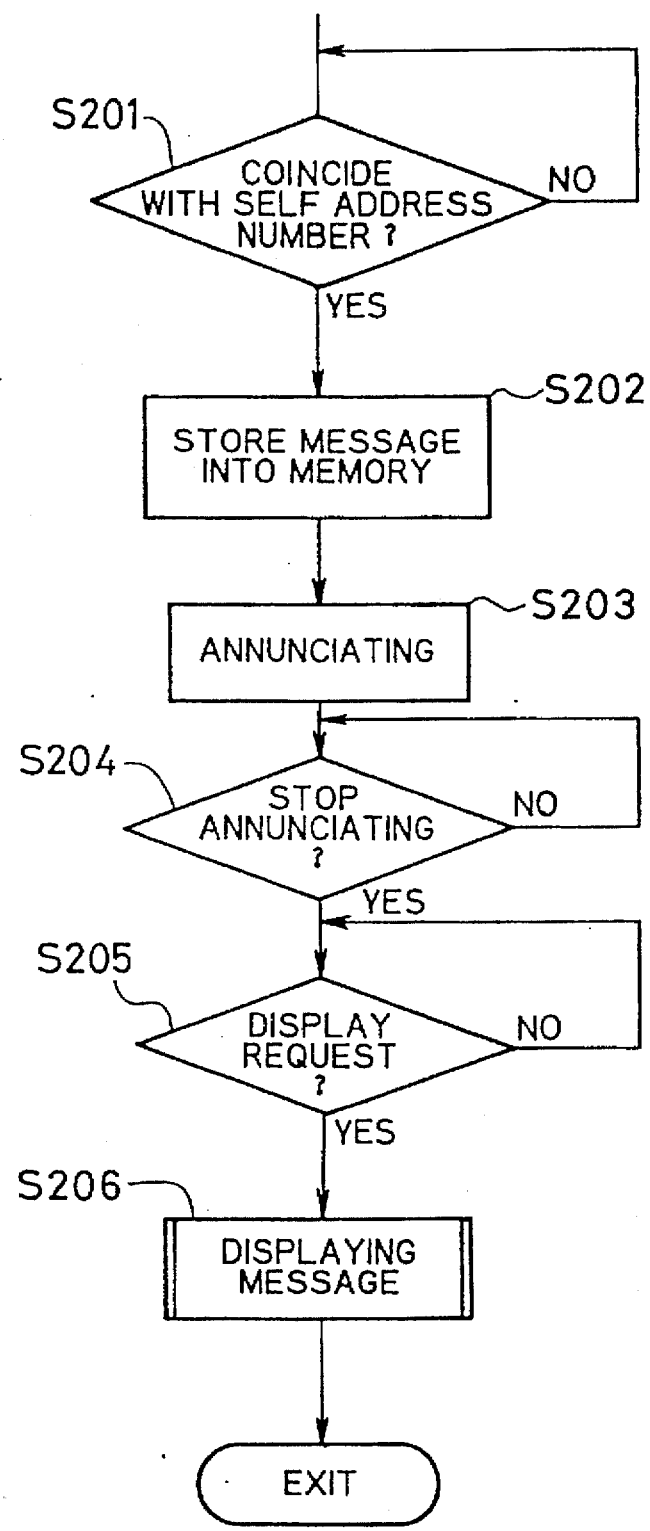
FIG. 3 is a flowchart showing one example of a receiving operation of the present embodiment.

First, referring to FIG. 3, after receiving the call signal, it is judged whether the destination number of the call signal coincides with the registered address number of the portable radio apparatus (S201). If the destination number coincides with its own number, the message data is stored in the memory 103 (S202) and the annunciator 106 is operated (S203). The operation of the annunciator 106 continues until the user operates the annunciator stop key 17 (S204). When the annunciator stop key 17 is operated and further a display request is made (S205), a message displaying routine is performed (S206). The display request may be made by pushing the annunciator stop key 17 again or by operating another key, for example, the scroll-up key 18 or the scroll-down key 19.

As shown in FIG. 4, after a variable M is initialized (S207), an open/close state of the housings 10 and 11 is detected according to the output of the open/close detector 15 (S208). If it is in the open state, N is set at forty (40) (S209), and if it is in the closed state, N is set at ten (10) (S210), where N is the number of characters displayed on-screen.

Subsequently, the controller 104 transfers data of one character from the memory 103 to the driver 105 (S211). After the variable M is incremented (S212), it is judged whether the transferred data is stop bit data or not (S213), the stop bit data representing the end of the received message data. If it is not the stop bit data, then it is further judged whether M reaches N or not (S214). If M does not reach N (No in S214), successive character data is read out from the memory 103 and is transferred to the display driver 105 (S211), and similarly the steps S211–S214 are repeated until the stop bit data is read out (S213) or M reaches N (S214).

If the data transferred to the LCD driver 105 reach the predetermined amount N (Yes in S214), the LCD driver 105 drives the display 13 to display the data of N words on screen (S215). The display area of the display 13 is defined by the set value N. That is, if N=40 (S209), the data of 40 words are displayed on the full display area, and if N=10 (S210), the data of 10 words are displayed on the partial display area 14.

Further, if the display request is made (Yes in S216), successive N words of the message data are displayed in the same procedure (S211 to S215) unless the stop bit data is read out (S213). If the stop bit data is read out from the memory 103 (Yes in S213), the data transferred to the LCD driver 105 before that time are displayed on the display 13 (S217), and then the flow of control goes out of the message displaying routine.

In this way, the received message stored in the memory 103 is displayed either in the full display area or the partial display area 14 depending on whether the first housing 10 and the second housing 11 are open or closed. Furthermore, even if they are in the closed state, the whole message is displayed on the partial display area 14 by the display request (S216) which is made by operating a basic function key 17, 18 or 19 disposed on the outer face of the second housing 11. As a matter of course, when the message is displayed on the full display area in the open state of the housings, the received message can be scrolled by the scroll keys of the key pad 16.

Figure 5A:
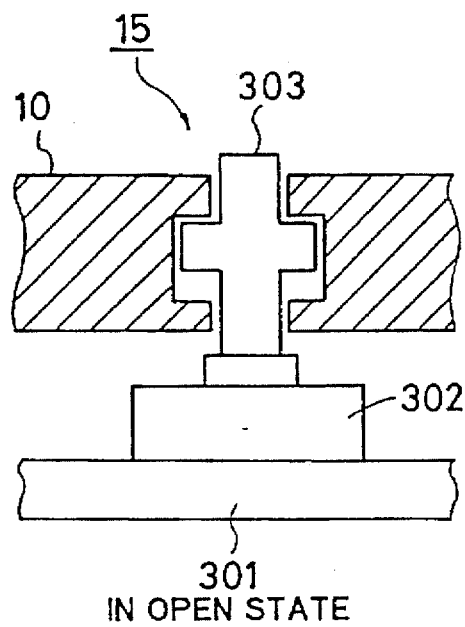
FIG. 5A is a sectional view of an open/close detector in the radio apparatus of FIG. 1A in the open state.
Figure 5B:
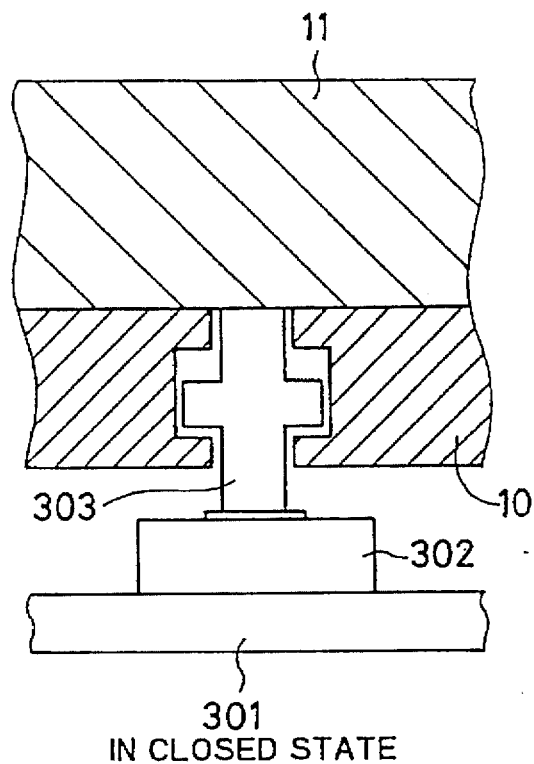
FIG. 5B is a sectional view of the open/close detector in the radio apparatus of FIG. 1B in the closed state.

FIGS. 5A and 5B show an example of the open/close detector 15. The open/close detecting switch 302 is mounted on the print board 301 installed inside the first housing 10. A movable piece 303 is disposed through a wall of the first housing 10 at a position corresponding to the open/close detecting switch 303. The movable piece 303 can move in a direction perpendicular to the inner face of the first housing 10 within a restricted range. In the open state of the housings 10, 11 as shown in FIG. 5A, the movable piece 303 is energized in a protruding direction thereof by the open/close detecting switch 302. In the closed state of the housing 10, 11 as shown in FIG. 5B, the movable switch 302 is depressed by the second housing 11 causing the open/close detecting switch 302 to be pressed against the energizing force.

Figure 6:
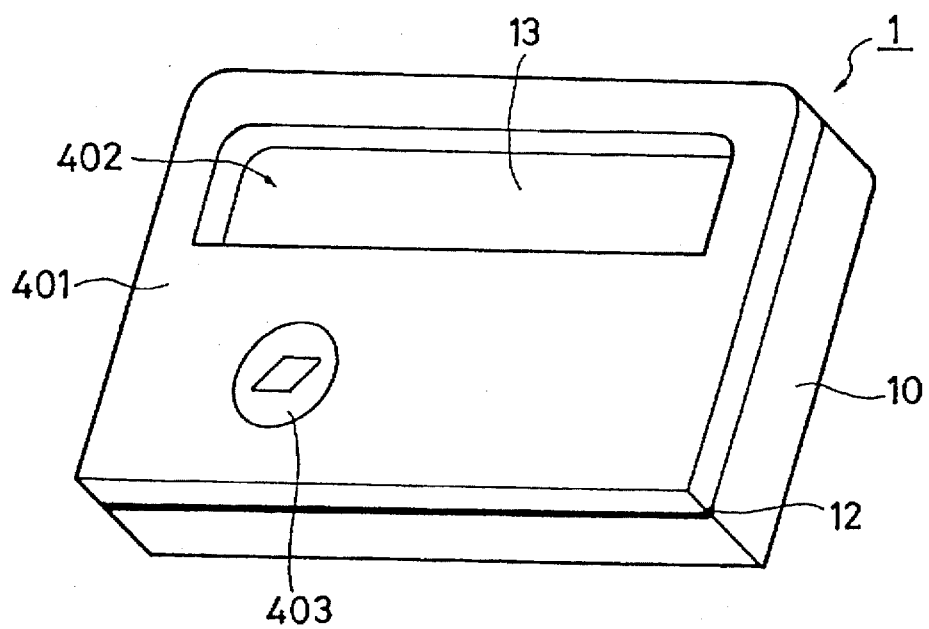
FIG. 6 is a perspective view showing another embodiment of the portable electronic device according to the present invention.

The portable electronic device according to the present invention is not limited to the appearance shown in FIGS. 1A and 1B. It may be constructed in such a manner that, as shown in FIG. 6, the second housing 401 connected to the first housing 10 through the hinge 12 is provided with a window 402 through which the partial display area 14 of the display 13 may be seen. Further, the window 402 may be formed by a transparent plate for protection.

Also, the basic function keys disposed on the outer face of the second housing 401 are not limited to the first embodiment. A single key 403 for serving the functions of the stop key and the scroll key may be disposed therein, or the basic function keys may be disposed on an outer side of the first housing.

Further, the open/close detector 15 is not necessary. A display area may be changed between the full display area and the partial display area by operating a predetermined key of the key pad 16. More specifically, when the message is received, the message is displayed on the partial display area. The user opens the housings 10 and 11, and operates the predetermined key of the key pad 16 in a state where the housings are opened to change the display from the partial display area to the full display area.

What is claimed is:

1. A method for displaying data on a display having a predetermined display area in a portable electronic apparatus which comprises a first housing provided with the display in an inner side of the first housing and a second housing connected to the first housing such that the first housing and the second housing are opened and closed, the method comprising the steps of:

determining a partial display area of the predetermined display area which is visible in a closed state of the first housing and the second housing; and switching a display area of the display between the predetermined display area and the partial display area.

2. The method according to claim 1, wherein the step of switching performed according to a housing state which is one of an open state and the closed state of the first housing and the second housing.

3. A method for displaying data on a display having a predetermined display area in a portable electronic apparatus which comprises a first housing provided with the display in an inner side of the first housing and a second housing connected to the first housing such that the first housing and the second housing are opened and closed, the method comprising the steps of:

determining a partial display area of the predetermined display area which is visible in a closed state of the first housing and the second housing;

detecting a housing state which is one of an open state and the closed state of the first housing and the second housing; and controlling the display according to the housing state such that the data is displayed in the predetermined display area at the open state and the data is displayed in only the partial display area at the closed state.

4. The method according to claim 3, wherein the partial display area is determined by a number of characters which are to be displayed on the display.

5. The method according to claim 4, wherein:

the predetermined display area is capable of containing a first number of characters;

the partial display area is capable of containing a second number of characters smaller than the first number of characters; and the data is displayed on the display by the first number of characters at the open state and the data is displayed on the display by the second number of characters at the closed state.

6. The method according to claim 3, wherein the housing state is detected by a switch for switching on and off depending on the housing state.

7. The method according to claim 3, wherein the housing state is detected by a predetermined key mounted on an inner side of the second housing.

8. A portable radio apparatus comprising a radio receiver and a display having a predetermined display area, the portable radio apparatus comprising:

a first housing provided with the display in an inner side of the first housing;

a second housing connected to the first housing such that the first housing and the second housing are opened and closed, the second housing having a transparent portion through which a partial display area of the predetermined display area is visible in a closed state of the first housing and the second housing;

storage means for storing a message received by the radio receiver;

switch control means for controlling the storage means and the displays such that a display area of the display switches between the predetermined display area and the partial display area.

9. The portable radio apparatus according to claim 8, wherein the switch control means comprises:

detecting means for detecting a housing state which is one of an open state and the closed state of the first housing and the second housing; and control means for controlling the storage means and the display according to the housing state such that the message is read out from the storage means to be displayed in the predetermined display area at the open state and the message is read out from the storage means to be displayed in only the partial display area at the closed state.

10. The portable radio apparatus according to claim 9, wherein the detecting means comprises a switch for switching on and off according to the housing state, the switch being mounted on one of the inner side of the first housing and an inner side of the second housing.

11. The portable radio apparatus according to claim 9, wherein the detecting means comprises a key mounted on an inner side of the second housing.

12. The portable radio apparatus according to claim 9, wherein the portable radio apparatus is a selective calling receiver.

13. The portable radio apparatus according to claim 9, wherein the portable radio apparatus is a pager.

14. The portable radio apparatus according to claim 8, wherein the partial display area is determined by a number of characters which are to be displayed on the display.

15. The portable radio apparatus according to claim 14, wherein:
the predetermined display area is capable of containing a first number of characters;
the partial display area is capable of containing a second number of characters smaller than the first number of characters; and
the control means performs a read control such that the message is read from the storage means and is transferred to the display by the first number of characters at the open state and the message is read from the storage means and is transferred to the display by the second number of characters at the closed state.

16. The portable radio apparatus according to claim 8, wherein the first housing is provided with at least one basic function key in an outer side of the first housing, the basic function key comprising a display operation key for displaying the data in the partial display area.

17. The portable radio apparatus according to claim 8, wherein the second housing is provided with at least one basic function key in an outer side of the second housing, the basic function key comprising a display operation key for displaying the data in the partial display area.

18. The portable radio apparatus according to claim 8, wherein:
the second housing is provided with at least one basic function key in an outer side of the second housing, the basic function key comprising a display operation key for displaying the data in the partial display area; and
the second housing is further provided with a plurality of function keys in an inner side of the second housing, the function keys comprising a display operation key for displaying the data in the predetermined display area.

19. The portable radio apparatus according to claim 18, wherein the detecting means comprises a key included in the function keys mounted on the inner side of the second housing.

20. The portable radio apparatus according to claim 8, wherein the transparent portion of the second housing is a window.

21. The portable radio apparatus according to claim 20, wherein the window comprises a transparent plate.

22. The portable radio apparatus according to claim 20, wherein the window comprises an opening.

23. The portable radio apparatus according to claim 8, wherein the transparent portion of the second housing is formed by the second housing which is smaller than the first housing in size.

24. The portable radio apparatus according to claim 8, wherein the portable radio apparatus is a selective calling receiver.

25. The portable radio apparatus according to claim 8, wherein the portable radio apparatus is a pager.

26. An apparatus for displaying data on a display having a predetermined display area, the apparatus comprising:
a first housing provided with the display;
a second housing connected to the first housing such that the first housing and the second housing are opened and closed, the second housing having a transparent portion through which a partial display area of the predetermined display area is visible in a closed state of the first housing and the second housing; and
switching means for switching a display area of the display between the predetermined display area and the partial display area.

27. The apparatus according to claim 26, wherein the switching means switches the display area of the display between the predetermined display area and the partial display area according to a housing state which is one of an open state and the closed state of the first housing and the second housing.

28. The apparatus according to claim 26, wherein the first housing is provided with at least one basic function key in an outer side of the first housing, the basic function key comprising a display operation key for displaying the data in the partial display area.

29. The apparatus according to 26, wherein the second housing is provided with at least one basic function key in an outer side of the second housing, the basic function key comprising a display operation key for displaying the data in the partial display area.

30. The apparatus according to claim 26, wherein:
the second housing is provided with at least one basic function key in an outer side of the second housing, the basic function key comprising a display operation key for displaying the data in the partial display area; and
the second housing is further provided with a plurality of function keys in an inner side of the second housing, the function keys comprising a display operation key for displaying the data in the predetermined display area.

31. The apparatus according to claim 26, wherein the transparent portion of the second housing is a window.

32. The apparatus according to claim 31, wherein the window comprises a transparent plate.

33. The apparatus according to claim 31, wherein the window comprises an opening.

34. The apparatus according to claim 26, wherein the transparent portion of the second housing is formed by the second housing which is smaller than the first housing in size.

35. An apparatus for displaying data on a display having a predetermined display area, the apparatus comprising:
a first housing provided with the display;
a second housing connected to the first housing such that the first housing and the second housing are opened and closed, the second housing having a transparent portion through which a partial display area of the predetermined display area is visible in a closed state of the first housing and the second housing;
detecting means for detecting a housing state which is one of an open state and the closed state of the first housing and the second housing; and
display control means for controlling the display according to the housing state such that the data is displayed in the predetermined display area at the open state and the data is displayed in only the partial display area at the closed state.

36. The apparatus according to claim 35, wherein the first housing is provided with at least one basic function key in an outer side of the first housing, the basic function key comprising a display operation key for displaying the data in the partial display area.

37. The apparatus according to claim 35, wherein the second housing is provided with at least one basic function key in an outer side of the second housing, the basic function key comprising a display operation key for displaying the data in the partial display area.

38. The apparatus according to claim 35, wherein:

the second housing is provided with at least one basic function key in an outer side of the second housing, the basic function key comprising a display operation key for displaying the data in the partial display area; and the second housing is further provided with a plurality of function keys in an inner side of the second housing, the function keys comprising a display operation key for displaying the data in the predetermined display area.

39. The apparatus according to claim 38, wherein the detecting means comprises a key included in the function keys mounted on the inner side of the second housing.

40. The apparatus according to claim 35, wherein the detecting means comprises a switch for switching on and off according to the housing state, the switch being mounted on one of an inner side of the first housing and an inner side of the second housing.

41. The apparatus according to claim 35, wherein the detecting means comprises a first electrode provided on the first housing and a second electrode provided on the second housing, the first electrode and the second electrode being to come in contact with each other in the closed state.

42. The apparatus according to claim 35, wherein the detecting means comprises a key mounted on an inner side of the second housing.

43. The apparatus according to claim 35, wherein the transparent portion of the second housing is a window.

44. The apparatus according to claim 43, wherein the window comprises a transparent plate.

45. The apparatus according to claim 43, wherein the window comprises an opening.

46. The apparatus according to claim 35, wherein the transparent portion of the second housing is formed by the second housing which is smaller than the first housing in size.

* * * * *